(12) United States Patent
Ogata

(10) Patent No.: US 8,077,580 B2
(45) Date of Patent: Dec. 13, 2011

(54) OPTICAL INFORMATION RECORDING AND REPRODUCING APPARATUS

(75) Inventor: Takeshi Ogata, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 128 days.

(21) Appl. No.: 12/420,205

(22) Filed: Apr. 8, 2009

(65) Prior Publication Data

US 2009/0257337 A1 Oct. 15, 2009

(30) Foreign Application Priority Data

Apr. 11, 2008 (JP) ................................ 2008-103026

(51) Int. Cl.
*G11B 7/00* (2006.01)
(52) U.S. Cl. ................... 369/103; 369/53.15; 369/53.17
(58) Field of Classification Search .................. 369/103, 369/53.15–53.17
See application file for complete search history.

(56) References Cited

U.S. PATENT DOCUMENTS

| 2006/0203690 | A1 | 9/2006 | Uchida et al. | |
|---|---|---|---|---|
| 2006/0238841 | A1 | 10/2006 | Anderson et al. | |
| 2006/0279824 | A1* | 12/2006 | Riley et al. | 359/35 |
| 2007/0104061 | A1 | 5/2007 | Aufderheide et al. | |
| 2007/0171796 | A1 | 7/2007 | Tokuyama | |
| 2007/0285751 | A1 | 12/2007 | Kim | |
| 2008/0059144 | A1* | 3/2008 | Earhart et al. | 703/23 |
| 2008/0101187 | A1* | 5/2008 | Kohmoto et al. | 369/53.17 |
| 2008/0192311 | A1 | 8/2008 | Horimai | |

FOREIGN PATENT DOCUMENTS

| CN | 101086861 A | 12/2007 |
|---|---|---|
| JP | 61-104439 | 5/1986 |
| JP | 61-104440 | 5/1986 |
| JP | 04-168638 | 6/1992 |
| JP | 04-271076 | 9/1992 |
| JP | 07-176049 | 7/1995 |
| JP | 07-249240 | 9/1995 |
| JP | 09-190628 | 7/1997 |
| JP | 2003-178538 | 6/2003 |
| JP | 2004-227632 | 8/2004 |
| JP | 2004-272268 | 9/2004 |
| JP | 2006-078380 | 3/2006 |
| JP | 2006-235261 | 9/2006 |
| JP | 2006-243241 | 9/2006 |
| JP | 2006-252699 | 9/2006 |
| JP | 2006-286075 | 10/2006 |
| JP | 2006-343533 | 12/2006 |
| JP | 2007-200385 | 8/2007 |
| JP | 2007-248595 | 9/2007 |
| WO | WO 2004/102542 A1 | 11/2004 |
| WO | WO 2007059446 A2 | 5/2007 |

* cited by examiner

OTHER PUBLICATIONS

Chinese Office Action; Application No. 200910118355.X; Mailing Date: Sep. 2, 2010.
Office Action issued Oct. 4, 2011; Application No. 2008-103026; 2 pages.

*Primary Examiner* — Adam R Giesy
(74) *Attorney, Agent, or Firm* — Antonelli, Terry, Stout & Kraus, LLP.

(57) ABSTRACT

An optical information recording and reproducing apparatus includes an optical pickup, a phase conjugate optical system, a disc cure optical system, and a defect discrimination optical system; and an optical detector that receives a light emitted from the defect discrimination optical system and transmitted through or reflected from an optical information recording medium. A reference light and a signal light emitted from the optical pickup are irradiated onto the optical information recording medium to record and reproduce digital information by using a holography.

20 Claims, 7 Drawing Sheets

OPTICAL INFORMATION RECORDING AND REPRODUCING APPARATUS

INCORPORATION BY REFERENCE

The present application claims priority from Japanese application JP2008-103026 filed on Apr. 11, 2008, the content of which is hereby incorporated by reference into this application.

BACKGROUND

The present invention relates to an optical information recording and reproducing apparatus to record/reproduce information in/from an optical information recording medium by using a holography.

In these days, with the Blu-ray Disc (BD) standard and the High Definition Digital Versatile Disc (HD DVD) standard, optical discs having as large as 50 GB recording density can be produced on a commercial basis in a consumer use by using a blue-violet semiconductor laser.

In the future, it is desired that the optical disc has a large recording capacity such as HDD (Hard Disc Drive) having as large as 100 GB to 1 TB.

However, for a purpose of realizing the above-mentioned ultra-high density optical disc, a new storage technique is required such that it is different from an old trend using an existing high density technique that depends on making a wavelength shorter and the NA of an object lens higher.

On researching into a next-generation storage technique, a hologram recording technique has been taken notice of recording digital information by using the holography.

The hologram recording technique is that a signal light having information of page data modulated two-dimensionally by a spatial light modulator is superposed with a reference light inside a recording medium, and an interference fringe pattern occurs at this time to thereby arise a refraction index modulation inside the recording medium to thereby record information.

On reproducing information, the reference light used for recording is irradiated onto the recording medium with the same setup of the reference light. Consequently, a hologram recorded in the recording medium acts as a diffraction grating to generate a diffracted light. This diffracted light is reproduced as an identical light containing the recorded signal light and phase information.

A reproduced signal light is detected two-dimensionally at a high speed by using an optical detector such as CMOS, CCD, etc. The above-mentioned hologram recording is effective for recording and reproducing a large amount of information at a high speed, since two-dimensional information is recorded and reproduced simultaneously by using a single hologram and a plural number of page data can be overwritten on the same position.

JP-A-2004-272268 (US2006/238841) has proposed a hologram recording technique. This document discloses a so-called angle multiplexing recording system in which a signal beam is converged onto an optical information recording medium by a lens and, at the same time, the reference light of a parallel beam is irradiated thereon so as to be made interfered with the signal beam to record a hologram, and further, in order to execute a multiple recording, different page data is displayed on the special light modulator, while an incident angle of the reference light toward the optical recording medium is varied. JP-A-2004-272268 also discloses a technique in which the signal light is converged on the optical information recording medium by a lens to arrange an opening or aperture (spatial filter) on its light waist position, so that an interval adjacent to the hologram can be made short, and the recording density or capacity can be made increased, compared with the existing angle multiplexing recording system.

WO2004-102542 (US2008/192311) has also proposed a hologram recording technique. This document discloses a technique using a shift multiplex system in which a light coming from an inner side of pixels is set to the signal beam in a single spatial light modulator and a light coming from an outer side of orbicular zone pixels is set to the reference light therein. Both of the light beams are converged onto an optical recording medium by using the same lens so as to make the signal and reference lights interfered at a vicinity of a lens focal plane to thereby record a hologram.

SUMMARY

In the meantime, in the case of the existing optical information recording apparatus typified by the BD, a verification process is applied to an optical information recording medium immediately after recording of information to enhance a recording reliability, for a purpose of discriminating the optical information recording medium having dust and scratch thereon, or defect such as bubble, impurity, etc., that are possibly present inside the recording medium.

At this time, a light used for the reproduction process has an intensity that does not change the property or quality of the optical information recording medium.

However, in the case of the optical information recording medium using the holography, the property or quality of the recording medium changes regardless of the light intensity. For this reason, the portion of recording medium near the location where record/reproducing occurs is changed in property or quality caused by a light diffusion and reflection due to the recording and reproducing apparatus, optical information recording medium, scratch and defect, when recording and reproduction are attempted to be executed at the portion of the recording medium where the dust or scratch is present thereon or where the defect such as bubble, impurity, etc., is present inside the medium. Therefore, the recording medium is affect by a reduction in the amount of recording capability. In consequence, the recording and reproduction at the portion of defect of the medium reduces the reliability of the recording medium.

The invention is made in light of the above-mentioned problems, and an object of the invention is to provide an optical information recording and reproducing apparatus that does not adversely affect portions of the optical information recording medium around or adjacent to a defect of the recording medium by finding the defect early even for an optical information recording medium which contains a dust or a scratch present on the recording medium or a defect such as bubble, impurity, etc., present inside the recording medium.

To attain the object of the invention, according to one aspect of the present invention, an optical information recording apparatus is structured as follows.

In a holography information recording and reproducing apparatus wherein a reference light and a signal light are irradiated onto an optical information recording medium to record digital information in the recording medium by using a holography, the optical information recording apparatus comprises: an optical pickup, a phase conjugate optical system and/or a disc cure optical system and/or a defect discrimination optical system, and an optical detector that receives a light emitted from the defect discrimination optical system and transmitted through or reflected from the optical information recording medium.

According to the invention, on recording the digital information by using the holography, the optical information recording and reproducing apparatus can record information at a high reliability without affecting peripheral portions around or adjacent to a defect, even though a dust or scratch is present on the recording medium or a defect such as bubble, impurity, etc., is present inside the recording medium.

The other objects, features and advantages of the invention will become apparent from the following description of the embodiments of the invention taken in conjunction with the accompanying drawings.

DETAILED DESCRIPTION OF THE EMBODIMENTS

Hereinafter, embodiments of the invention will be described with reference to the drawings.

Embodiment 1

Figure 1:
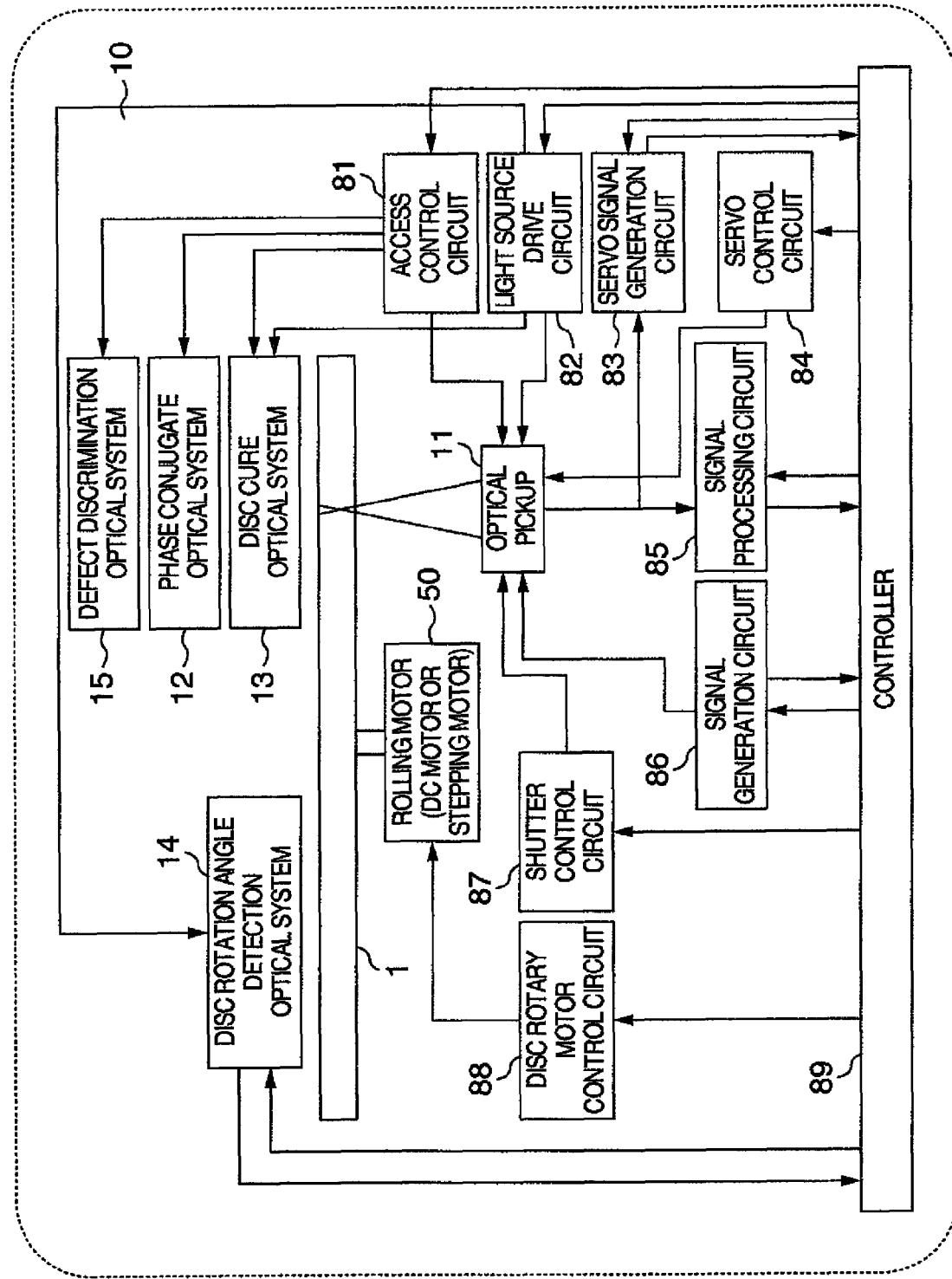
FIG. 1 is a schematic diagram showing an optical information recording and reproducing apparatus in an embodiment of the invention.

FIG. 1 is a constitutional diagram entirely showing an optical information recording and reproducing apparatus for recording and/or reproducing digital information by using a holography.

An optical information recording and reproducing apparatus 10 includes an optical pickup 11, a phase conjugate optical system 12, a disc cure optical system 13, a disc rotation angle detection-use optical system 14, a defect discrimination optical system 15, and a rotary motor 50 (DC motor or stepping motor). An optical information recording medium 1 can be rotated by the rotary motor 50.

The optical pickup 11 irradiates a reference light and a signal light on the recording medium 1 to record digital information by using the holography.

In this case, information signal to be recorded is sent to a spatial light modulator incorporated (to be described later) in the optical pickup 11 via a signal generation circuit 86 by a controller 89, and the signal light is modulated by the spatial light modulator.

In the case of reproducing information recorded in the recording medium 1, a phase conjugate light of the reference light emitted from the optical pickup 11 is generated by the phase conjugate optical system 12. Here, the phase conjugate light is a light wave that progresses in an inverse direction against an input light, while maintaining an identical wave surface (wavefront) of the inputted light. A reproduced light reproduced by the phase conjugate light is then detected by an optical detector (to be described later) incorporated in the optical pickup 11 to reproduce a signal by a signal processing circuit 85.

An irradiation time period of the reference light and signal light to be irradiated on the recording medium 1 can be adjusted by the controller 89 that controls an open-close time period of a shutter (to be described later) in the optical pickup 11 via a shutter control circuit 87.

The disc cure optical system 13 generates a light beam to be used for a pre-cure process and a post-cure process of the recording medium 1. Here, the pre-cure process means a preceding process that irradiates a predetermined light beam on a desired position in advance before irradiating the reference light and signal light on the recording medium 1, when information is recorded in the desired position on the recording medium 1. The post-cure process means a post process that irradiates a predetermined light beam on a desired position to turn the desired position into a write inhibit, after information is recorded in the desired position on the recording medium 1.

Figure 2:
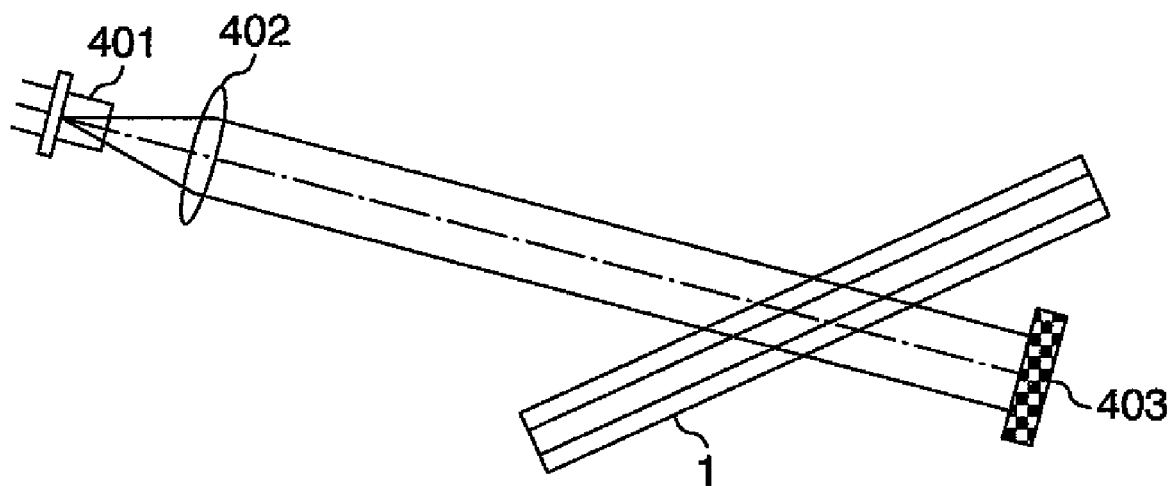
FIG. 2 is a schematic diagram showing a defect discrimination optical system.
Figure 3:
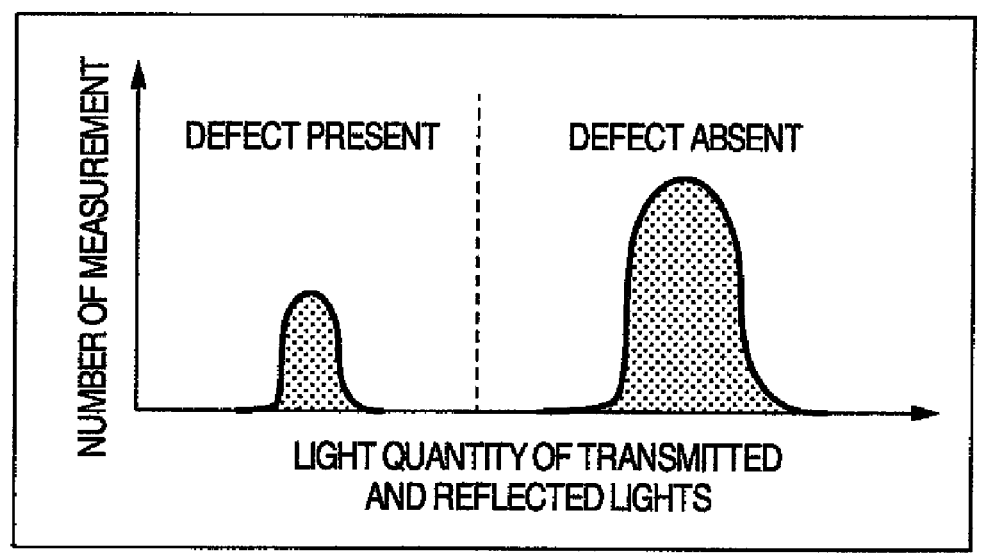
FIG. 3 is a characteristic diagram showing a light quantity variation of an optical detector in response to a presence or absence of a defect.

FIG. 2 shows a constitutional example of the defect discrimination optical system 15 to generate a light beam used for a defect discrimination of the recording medium 1. The defect discrimination optical system 15 is constituted by a light source 401, a collimate lens 402 to turn the light beam into an arbitrary spread beam, and an optical detector 403 to be able to measure a light quantity of the light beam to be transmitted through the recording medium 1 or reflected from that. Here, the defect means foreign objects that make it impossible to carry out a holography recording for peripheral portions around or adjacent to a defect such as dust and scratch present on the recording medium 1, and bubble, impurity, etc., present inside the recording medium 1. FIG. 3 is a diagram showing a light quantity of the light transmitted through or reflected from the recording medium 1 to be discriminated by the defect discrimination optical system 15 based on the presence/absence of a defect.

In the case where a defect is present in the recording medium 1, the irradiated light beam is reflected from or absorbed in the defect to make its light quantity detected by the optical detector 403 shown in FIG. 3 smaller, compared with the light quantity transmitted through the recording medium 1 without the defect. Here, the discrimination of the defect is that a threshold value is given to the light quantity of the light that is transmitted through or reflected from the recording medium 1 to be discriminated by whether a defect for providing an obstacle for recording is present in a desired position, by using the above-mentioned principle, and the discrimination for a presence or absence of the defect is executed by whether the light quantity of the detected light exceeds the threshold value.

The disc rotation angle detection-use optical system 14 in FIG. 1 is used for detecting a rotation angle of the recording medium 1. In the case of adjusting the recording medium 1 to a predetermined rotation angle, a signal in response to the rotation angle is detected by the disc rotation angle detection-use optical system 14 to control the rotation angle of the recording medium 1 by the controller 89 via a rotary motor control circuit 88, by using the detected signal.

A light source drive circuit 82 supplies a light source drive current to each of the light sources of the optical pickup 11, disc cure optical system 13, disc rotation angle detection-use optical system 14, and defect discrimination optical system 15 to allow an light beam of a predetermined light quantity to be emitted from the respective light sources.

Further, each of the optical pickup 11, phase conjugate optical system 12, disc cure optical system 13, and defect discrimination optical system 15 provides a mechanism capable of sliding in a radial direction of the recording medium 1 to their positions, therefore, a position control can be executed for each by an access control circuit 81.

In the meantime, the recording technique using the holography is a technique capable of recording ultrahigh density information, therefore, there is a tendency for an allowable error to become extremely low for an inclination and a displacement of the recording medium 1, for example. For this reason, a mechanism is provided in the optical pickup 11 to detect a displacement amount caused by a relatively small allowable error, such as an inclination, displacement, etc., of the recording medium 1. A servo signal generation circuit 83 then generates a signal to be used for a servo control. A servo mechanism may be provided in the optical information recording and reproducing apparatus 10 to correct the displacement amount through a serve control circuit 84.

Further, the optical pickup 11, phase conjugate optical system 12, disc cure optical system 13, disc rotation angle detection-use optical system 14, and defect discrimination optical system 15, may be combined together in several optical system units or in one unit.

Figure 4:
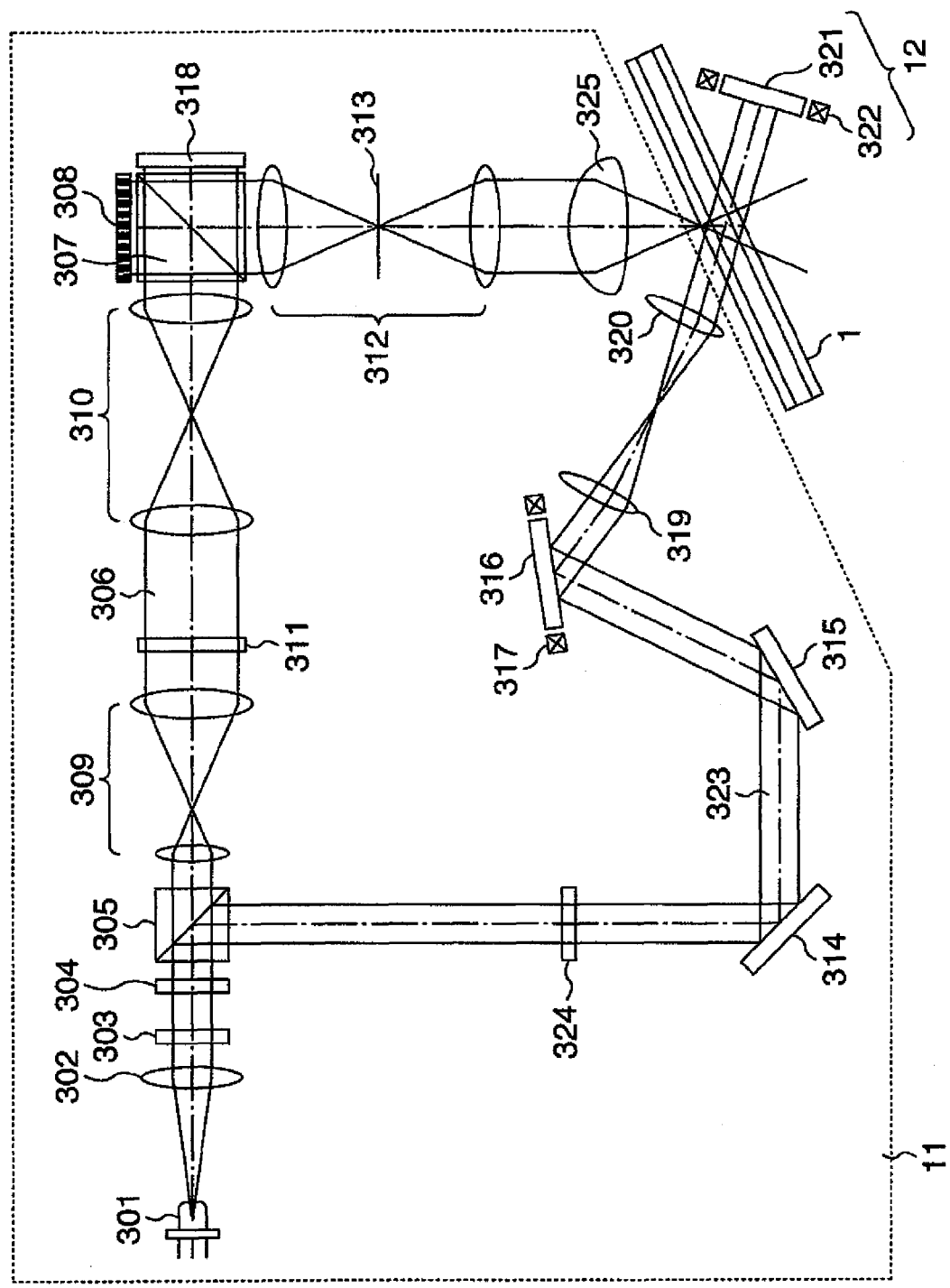
FIG. 4 is a schematic diagram showing an optical pickup in the optical information recording and reproducing apparatus of the embodiment in the invention.

FIG. 4 shows a constitution example (general angle multiplexing scheme) of an optical system of the optical pickup 11 in the optical information recording and reproducing apparatus 10.

The light beam emitted from a light source 301 transmits through a collimate lens 302 to then enter a shutter 303. When the shutter 303 is opened, the light beam transmits through the shutter 303 and then enters a PBS (Polarization Beam Splitter) prism 305, after a polarization direction of the light beam is controlled such that a light quantity ratio of a P-polarization and S-polarization is set to a desired ratio by an optical device 304 constituted by a half-wavelength plate, for example.

The light beam transmitted through the PBS prism 305 is expanded in an light beam diameter by a beam expander 309 and thereafter enters a spatial light modulator 308 via a phase mask 311, a relay lens 310, and a PBS prism 307.

A signal light beam 306 added with information by the spatial light modulator 308 transmits through the PBS prism 307 to propagate through a relay lens 312 and a space filter 313. Thereafter, the signal light beam 306 is converged onto the recording medium 1 by an object lens 325.

On the other hand, the light beam reflected by the PBS prism 305 acts as a reference light beam 323 to be set in a predetermined polarization direction by a polarization direction conversion device 324 depending upon the time of recording or reproducing to then enter a galvanometer mirror 316 via a mirror 314 and a mirror 315. An incident angle of the reference light beam 323 to be irradiated onto the recording medium 1, after passing through a lens 319 and a lens 320, can be set to a desired angle since the galvanometer mirror 316 can be adjusted by an actuator 317 in angle.

In this way, by irradiating the signal light beam 306 and reference light beam 323 on the recording medium 1 such that they are superposed with each other, an interference fringe pattern is formed inside the recording medium 1 and by writing this pattern in the recording medium 1, information is recorded. Further, it is possible to record information in an angle multiplexing recording since the incident angle of reference light beam 323 irradiated onto the recording medium 1 can be varied by the galvanometer mirror 316.

When reproducing the recorded information, the reference light beam 323 is irradiated onto the recording medium 1, and the light beam transmitted through the recording medium 1 is reflected by the galvanometer mirror 321 to thereby generate a phase conjugate beam, as described above.

An incident angle of the reflected light beam to be irradiated onto the recording medium 1, can be set to a desired angle since the galvanometer mirror 321 can be adjusted by an actuator 322 in angle.

A reproduced optical beam reproduced by the phase conjugate light propagates through the object lens 325, relay lens 312, and spatial filter 313. Thereafter, the reproduced light beam is reflected by the PBS prism 307 to enter an optical detector 318 to thereby reproduce the recorded signal.

Figure 5:
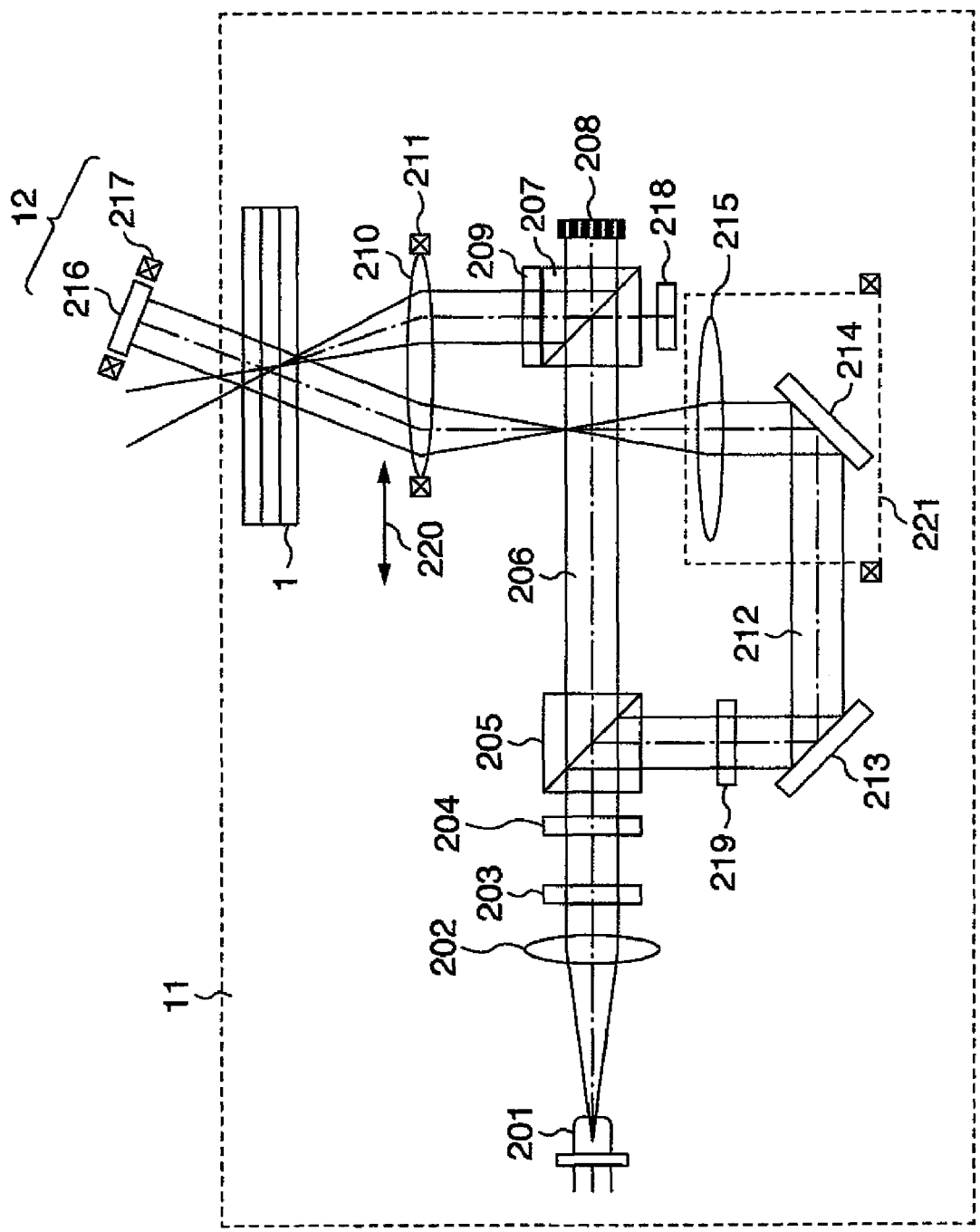
FIG. 5 is a schematic diagram showing another optical pickup in the optical information recording and reproducing apparatus of the embodiment in the invention.

In addition, the constitution of the optical system in the optical pickup 11 is not limited to the constitution in FIG. 4. For example, a constitution shown in FIG. 5 may be acceptable. FIG. 5 shows an example (monocular system) other than the optical system of the optical pickup 11 in FIG. 4 in the optical information recording and reproducing apparatus 10.

A constitution will be described with reference to FIG. 5.

The light beam emitted from a light source 201 transmits through a collimate lens 202 to then enter a shutter 203. When the shutter 203 is opened, the light beam transmits through the shutter 203 and, thereafter, enters a PBS prism 205, after a polarization direction of the light beam is controlled such that a light quantity ratio of a P-polarization and S-polarization is set to a desired ratio by an optical device 204 constituted by a half-wavelength plate, for example.

A light beam transmitted through the PBS prism 205 enters a spatial light modulator 208 via a PBS prism 207.

A signal light beam 206 added with information by the spatial light modulator 208 is reflected by the PBS prism 207 and propagates through an angle filter 209 which is a filter which allows only a light beam having a predetermined incident angle to pass therethrough. Thereafter, the signal light beam is converged onto the recording medium 1 by an object lens 210.

On the other hand, the light beam reflected by the PBS prism 205 acts as a reference light beam 212 to be set in a predetermined polarization direction by a polarization direction conversion device 219 in response to whether recording or reproducing is being performed. Thereafter, the reference light beam 212 enters a lens 215 via a mirror 213 and a mirror 214.

The lens 215 converges the reference light beam 212 onto a back-focus plane of the object lens 210, and the reference light beam once converged on the back-focus plane of the object lens 210 is turned again into a parallel beam by the object lens 210 to then irradiate on the recording medium 1.

Here, the object lens 210 or an optical block 221 can be driven by object lens actuator 211 in a direction indicated by an arrow 220. The position of the object lens 210 or optical block 221 is shifted in the arrow direction or a drive direction to vary a relative position relation between the object lens 210 and a converging point on the back-focus plane of the object lens 210, so that the incident angle of reference light beam 212 to be irradiated on the recording medium 1 can be set to a desired angle.

In this way, the signal light beam 206 and reference light beam 212 are irradiated on the recording medium 1, such that they are superposed with each other, to form the interference fringe pattern inside the recording medium 1 and write this pattern in the recording medium 1, thereby recording information. Further, the position of object lens 210 or optical block 221 is shifted in the drive direction 220 so as to be able to vary the incident angle of reference light beam 212 to be irradiated on the recording medium 1, so that it is possible to record information by the angle multiplexing recording.

When reproducing the recorded information, as described above, the reference light beam 212 is irradiated on the recording medium 1, and the light beam transmitted through the recording medium 1 is reflected by a galvanometer mirror 216 to thereby generate the phase conjugate beam.

An incident angle of the reflected light beam to be irradiated onto the recording medium 1, can be set to a desired angle since the galvanometer mirror 216 can be adjusted by an actuator 217 in angle.

A reproduced light beam by the phase conjugate light propagates through the object lens 210 and angle filter 209. Thereafter, the reproduced light beam transmits through the PBS prism 207 and enters an optical detector 218, thereby reproducing the recorded information.

The optical system shown in FIG. 5 has an advantage of being able to make it downsized considerably, compared with the constitution of the optical system in FIG. 4, since the signal light beam 206 and reference light beam 212 are entered into the same single object lens 210.

Figure 6C:
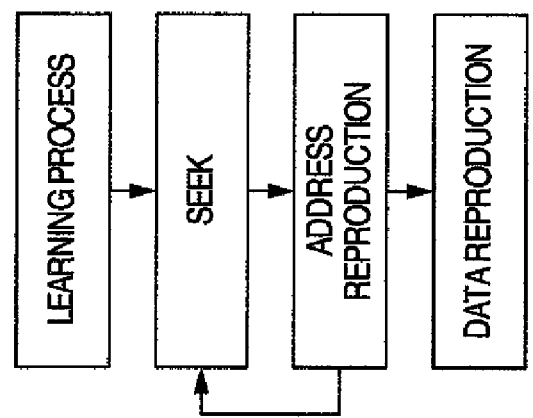
FIG. 6C is still another operation flowchart of the optical information recording and reproducing apparatus.
Figure 6B:
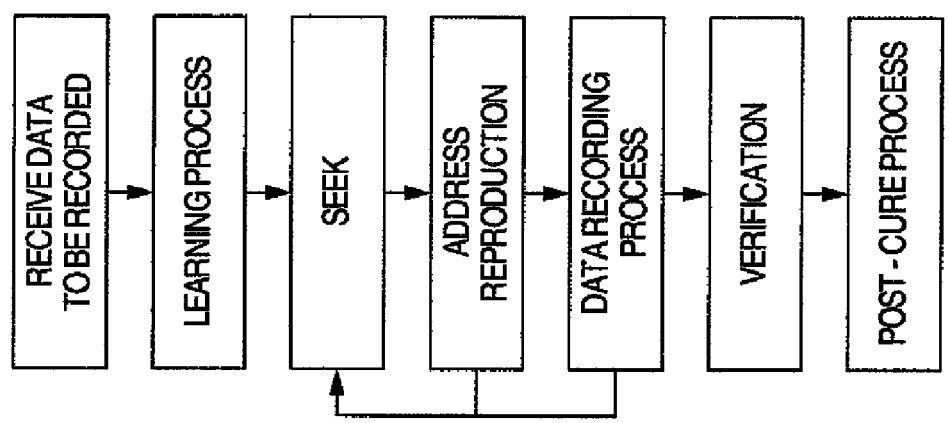
FIG. 6B is another operation flowchart of the optical information recording and reproducing apparatus.
Figure 6A:
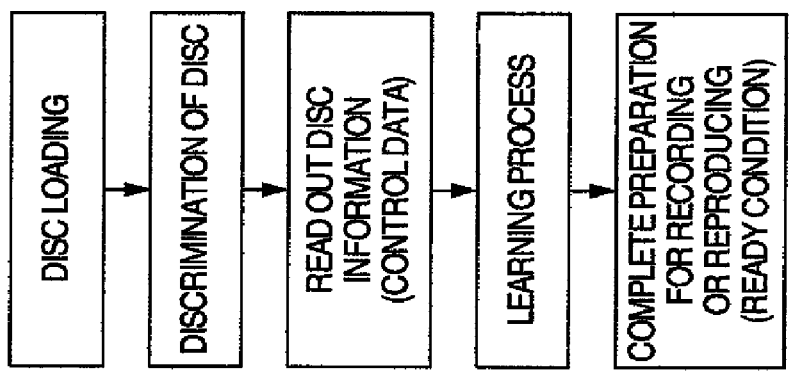
FIG. 6A is an operation flowchart of the optical information recording and reproducing apparatus.

FIGS. 6A to 6C show operation flowcharts of the recording and reproducing by the optical information recording and reproducing apparatus 10. Particularly, the following description will be concerned with operation flowcharts for the recording and reproducing by using the holography.

FIG. 6A shows an operation flowchart indicating from an operation from after the recording medium 1 is loaded into the optical information recording and reproducing apparatus 10 till a preparation for the record and reproduction is completed. FIG. 6B shows an operation flowchart indicating from a preparation completed condition till an operation that records information in the recording medium 1. FIG. 6C shows an operation flowchart indicating from the preparation completed condition till an operation that reproduces the recorded information from the recording medium 1.

Referring to FIG. 6A, the recording medium 1 is loaded in the optical information recording and reproducing apparatus 10. The apparatus 10 then discriminates whether the loaded recording medium 1 is for recording or reproducing digital information by using the holography.

From a discriminated result for the recording medium 1, if the apparatus 10 determines that recording medium 1 is for recording or reproducing the digital information by using the holography, the apparatus 10 reads out control data recorded in the recording medium 1 to obtain information regarding the recording medium 1 and information regarding various setting conditions for recording and reproducing.

After reading out the control data, the process of apparatus 10 executes a learning process concerning various adjustments and the optical pickup 11 in response to the control data to complete the preparation of recording or reproducing.

Referring to FIG. 6B, the flow of operation from the preparation completed condition till information recording is such that the apparatus 10 starts from receiving data to be recorded in the recording medium 1 to send the information corresponding to the data to the spatial light modulator in the optical pickup 11.

Thereafter, the apparatus 10 executes various leaning processes in advance, as required, so that high quality information can be recorded in the recording medium 1 and then arranges the optical pickup 11, disc cure optical system 13, and defect discrimination optical system 15, respectively, on predetermined positions, while repeating a seek operation and an address reproduction.

Thereafter, the apparatus 10 executes a data recording process (to be described later) to record the data in the recording medium 1. After recording the data, the data is verified as required, and the post-cure process is then executed by using the light beam emitted from the disc cure optical system 13.

Referring to FIG. 6C, the flow of operation from the preparation completed condition till reproducing the recorded information is such that the apparatus 10 executes various learning processes in advance, as required, so that high quality information can be reproduced from the recording medium 1. Thereafter, the apparatus 10 arranges the optical pickup 11 and phase conjugate optical system 12, respectively, on predetermined positions, while repeating the seek operation and the address reproduction.

Thereafter, the reference light beam is irradiated on the recording medium 1 from the optical pickup 11 to read out the recorded information.

Here, an operation of a data recording process of FIG. 6B will be described in detail. FIG. 7A shows an internal operation flowchart of the data recording process in FIG. 6B. The apparatus 10 arranges the optical pickup 11, disc cure optical system 13, and defect discrimination optical system 15, respectively, on predetermined positions, while repeating the seek operation and address reproduction. Thereafter, the apparatus 10 determines whether a defect is present or absent on the recording medium 1 based on the light quantity of the light beam transmitted through or reflected from the recording medium 1 after emitted from the defect discrimination optical system 15. If the apparatus 10 determines that there is a defect, a target recording address is changed to again execute the seek process and subsequent process.

If the apparatus 10 determines that there is no defect, a predetermined domain or area is then subject to the pre-cure process by using the light beam emitted from the disc cure optical system 13 and by using the reference light beam and signal light beam emitted from the optical pickup 11, recording of data is executed.

In this way, the process of discriminating the defect is employed at the beginning of data recording, so that the process which, in the case of the exiting recording method, is required to include all the processes including the pre-cure, data record and verification prior to executing the defect discrimination, can be shortened. By virtue of this, there is an advantage to enhance a recording rate in the case where information is to be recorded in the recording medium 1 having a defect. Further, a defect, if present, scatters and reflects a light to thereby irradiate unnecessary light on peripheral portions of the recording medium around or adjacent to the defect, thereby reducing a recording capability or capacity at the recording portions around or adjacent to the defect. However, since the detection process for the defect is executed before the pre-cure process, a further advantage can be obtained such that the portions of the recording medium around or adjacent to the defect are less affected.

Figure 7B:
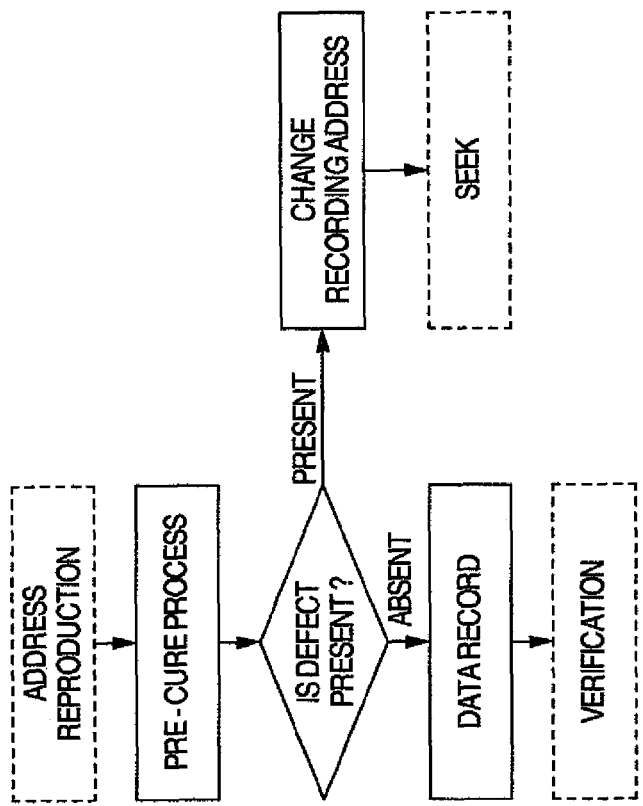
FIG. 7B is an operation flowchart of another data recording process in the optical information recording and reproducing apparatus.
Figure 7A:
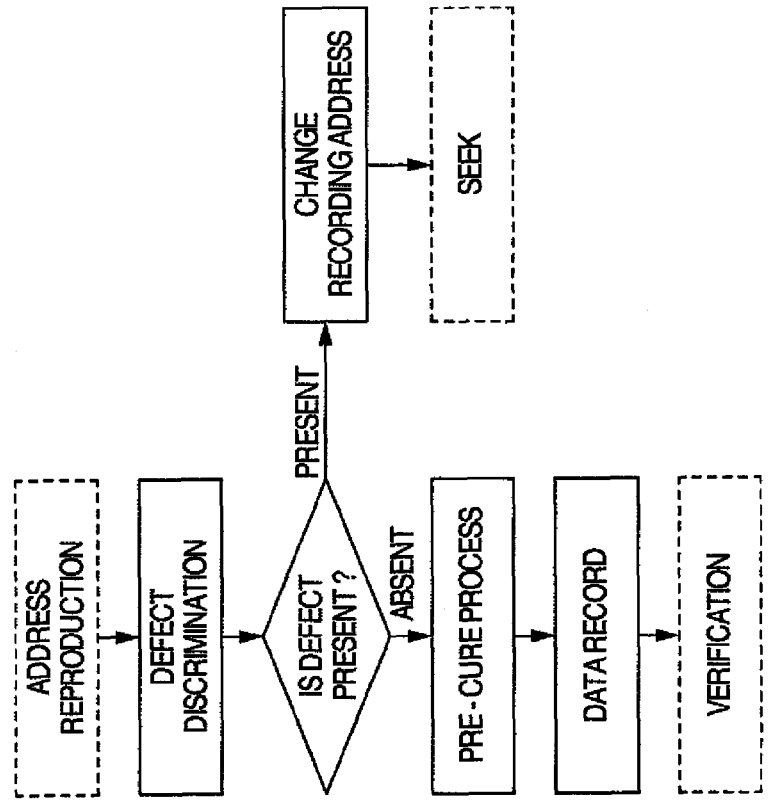
FIG. 7A is an operation flowchart of a data recording process in the optical information recording and reproducing apparatus.

FIG. 7B shows an internal operation flowchart in the case where the disc cure optical system 13 and defect discrimination optical system 15 are integrated so as to execute discrimination of a defect at the time of pre-cure, shown in FIG. 6B.

The apparatus 10 arranges the optical pickup 11, disc cure optical system 13, and defect discrimination optical system 15, respectively, on the predetermined positions, while repeating the seek operation and address reproduction. Then, the apparatus 10 executes the pre-cure process for the predetermined domain by using the light beam emitted from the disc cure optical system 13 and, at the same time, determines whether a defect is present or absent on the recording medium 1 in accordance with the light quantity of the light that is transmitted through or reflected from the recording medium 1. If the apparatus 10 determines that there is a defect, the pre-cure process is terminated immediately, and a target recording address is changed to again execute the seek process and subsequent process.

If the apparatus 10 determines that there is no defect, data is recorded by using the reference light and signal light emitted from the optical pickup 11.

Here, the process in FIG. 7B is faster than that in FIG. 7A in processing speed since the process in FIG. 7B can simultaneously execute the pre-cure process and defect discrimination.

Further, the apparatus 10 can be simplified since a function of emitting the light beam to the defect description optical system can be omitted by using the light beam emitted from the cure portion in place of the light beam for the defect discrimination.

Figure 8:
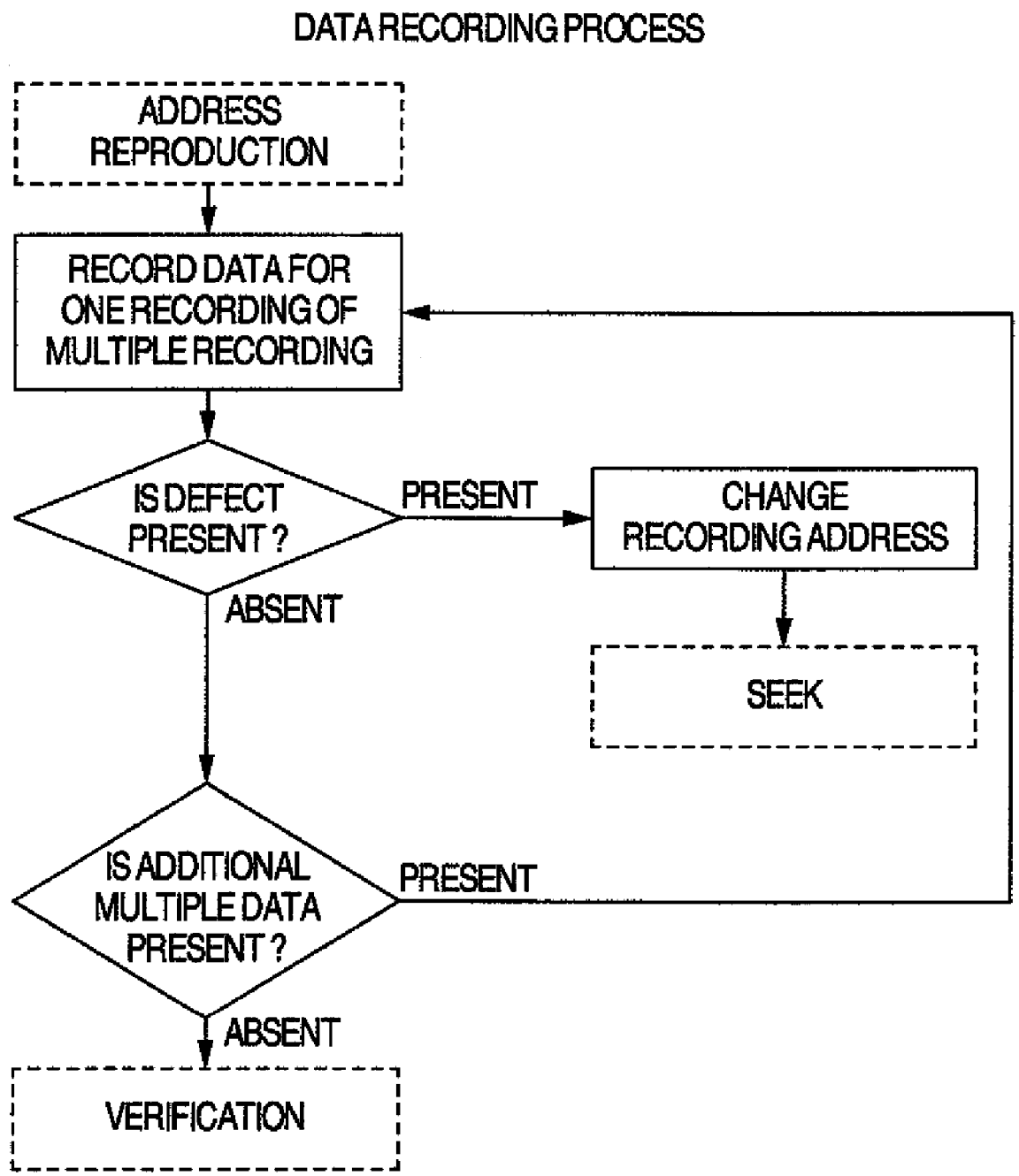
FIG. 8 is an operation flowchart of still another data recording process in the optical information recording and reproducing apparatus.

Further, FIG. 8 shows a recording processing flowchart in the case where the pre-cure and post-cure processes are unnecessary for recording information in the recording medium 1.

The apparatus 10 arranges the optical pickup 11 and defect discrimination optical system 15, respectively, on the predetermined positions over the recording medium 1, while repeating the seek operation and address reproduction. Thereafter, data for one recording in multiple recording is recorded by using the reference light and signal light emitted from the optical pickup 11. At this time, the optical detector provided in the defect discrimination optical system 15 receives the light quantity of the reference light or signal light transmitted through or reflected from the recording medium 1 to discriminate whether a defect is present or absent.

If the apparatus 10 determines that there is a defect, the pre-cure process is terminated immediately, and the target recording address is changed to again execute the seek process and subsequent process.

If no defect is determined, the process of the apparatus 10 determines whether a multiple recording is additionally executed in another predetermined position. If the multiple recording is executed, the optical pickup 11 is arranged on a position where the next multiple record can be executed to then repeat the recording of data for one recording in the multiple recording by using the reference light and signal light emitted from the optical pickup 11. If the multiple recording is no longer necessary, the process proceeds to a verification process as required.

With the above-mentioned defect discrimination in FIG. 7A, FIG. 7B, and FIG. 8, position information indicating that the recording is not executed because of the defect at that position, is recorded in the control data resided in the recording medium 1 so as to make it possible to discriminate the defect portion by reading out the control data afterward, when loading the recording medium 1 into the apparatus 10. Therefore, the record and reproduction operations can be controlled at the defect portion.

Generally, the position information on the defect portion is a small amount of data, compared with the information amount that can be recorded in a single position of the hologram. Further, since the hologram is recorded page by page basis, the record of hologram unfavorably uses a recording capacity greater than a constant amount even though information amount to be recorded is small.

For this reason, the recording capacity for the control data would be wasted if the recording of the position information indicating that the recording is not executed is executed every time a defect is found.

For these reasons, the position information indicating that the record is not executed is preferably recorded after the recording is completed or at the time of unloading the recording medium 1, so that a used amount of a hologram management domain can be reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical information recording and reproducing apparatus configured to irradiate a reference light emitted from an optical pickup and a signal light emitted from the optical pickup to record, and to reproduce digital information by using holography, the optical information recording and reproducing apparatus comprising: an optical pickup; a phase conjugate optical system; a disc cure optical system; a defect discrimination optical system; and an optical detector configured to receive a light emitted from the defect discrimination optical system and transmitted through or reflected from an optical information recording medium; wherein the optical information recording and reproducing apparatus is configured to determine, after receiving data to be recorded on an optical information recording medium and before or during pre-curing an area designated for recording received data on the optical information recording medium, whether or not a defect is present in the area designated for recording received data on the optical information recording medium based on the light emitted from the defect discrimination optical system; and wherein if a defect is found, changing the area designated for recording received data on the optical information recording medium, but if no defect is found, proceeding with pre-curing the area designated for recording received data on the optical information recording medium.

2. The apparatus according to claim 1, wherein whether information can be recorded or not is determined based on a light quantity of the light emitted from the defect discrimination optical system and transmitted through or reflected from the optical information recording medium.

3. The apparatus according to claim 2, wherein position information indicating that the information is not recorded in response to the light quantity of the light transmitted through or reflected from the optical information recording medium, is recorded in a control data domain which is used for recording information on the optical information recording medium.

4. The apparatus according to claim 3, wherein recording of information to be recorded in the control data domain is executed after the recording process.

5. The apparatus according to claim 3, wherein recording of information to be recorded in the control data domain is executed when unloading the optical information recording medium.

6. The apparatus according to claim 1, wherein when a defect is determined to be present on or in the optical information recording medium, the optical information recording and reproducing apparatus is configured to change a target recording address, and to perform a sequence of processes beginning with a seek process.

7. The apparatus according to claim 6, wherein when no defect is determined to be present on or in the optical information recording medium, the optical information recording and reproducing apparatus is configured to subject a predetermined area to a pre-cure process, and to record data onto the optical information recording medium.

8. An optical information recording and reproducing apparatus configured to irradiate a reference light emitted from an optical pickup and a signal light emitted from the optical pickup to record, and to reproduce digital information by using holography, the optical information recording and reproducing apparatus comprising: an optical pickup; a phase conjugate optical system; a disc cure optical system; and an optical detector configured to receive a light emitted from the disc cure optical system and transmitted through or reflected from an optical information recording medium; wherein the optical information recording and reproducing apparatus is configured to determine, after receiving data to be recorded on an optical information recording medium and before or during pre-curing an area designated for recording received data on the optical information recording medium, whether or not a defect is present in the area designated for recording received data on the optical information recording medium based on the light emitted from the defect discrimination optical system; and wherein if a defect is found, changing the area designated for recording received data on the optical information recording medium, but if no defect is found, proceeding with pre-curing the area designated for recording received data on the optical information recording medium.

9. The apparatus according to claim 8, wherein whether information can be recorded or not is determined based on a light quantity of the light emitted from the disc cure optical system and transmitted through or reflected from the optical information recording medium.

10. The apparatus according to claim 9, wherein position information indicating that the information is not recorded in response to the light quantity of the light transmitted through or reflected from the optical information recording medium, is recorded in a control data domain which is used for recording information on the optical information recording medium.

11. The apparatus according to claim 10, wherein recording of information to be recorded in the control data domain is executed after the recording process.

12. The apparatus according to claim 10, wherein recording of information to be recorded in the control data domain is executed when unloading the optical information recording medium.

13. The apparatus according to claim 8, wherein when a defect is determined to be present on or in the optical information recording medium, the optical information recording and reproducing apparatus is configured to immediately terminate any pre-cure process, to change a target recording address, and to perform a sequence of processes beginning with a seek process.

14. The apparatus according to claim 13, wherein when no defect is determined to be present on or in the optical information recording medium, the optical information recording and reproducing apparatus is configured to record data onto the optical information recording medium.

15. An optical information recording and reproducing apparatus configured to irradiate a reference light and a signal light emitted from an optical pickup to record, and to reproduce digital information by using holography, the optical information recording and reproducing apparatus comprising: an optical pickup; and a phase conjugate optical system; wherein the optical information recording and reproducing apparatus is configured to determine, after receiving data to be recorded on an optical information recording medium and before or during pre-curing an area designated for recording received data on the optical information recording medium, whether or not a defect is present in the area designated for recording received data on the optical information recording medium based on a light quantity of a transmitted light or a reflected light of either the reference light or the signal light irradiated onto an optical information recording medium; wherein if a defect is found, changing the area designated for recording received data on the optical information recording medium, but if no defect is found, proceeding with pre-curing the area designated for recording received data on the optical information recording medium; and wherein whether a recording of information is continued or discontinued is determined based on a light quantity of a transmitted light or a reflected light of either the reference light or the signal light irradiated onto an optical information recording medium when recording data on the optical information recording medium.

16. The apparatus according to claim 15, wherein position information indicating that the information is not recorded in response to the light quantity of the light transmitted through or reflected from the optical information recording medium, is recorded in a control data domain which is used for recording information on the optical information recording medium.

17. The apparatus according to claim 16, wherein recording of information to be recorded in the control data domain is executed after the recording process.

18. The apparatus according to claim 16, wherein recording of information to be recorded in the control data domain is executed when unloading the optical information recording medium.

19. The apparatus according to claim 15, wherein when a defect is determined to be present on or in the optical information recording medium, the optical information recording and reproducing apparatus is configured to immediately terminate any pre-cure process, to change a target recording address, and to perform a sequence of processes beginning with a seek process.

20. The apparatus according to claim 19, wherein when no defect is determined to be present on or in the optical information recording medium, the optical information recording and reproducing apparatus is configured to
  determine whether or not a multiple recording is additionally executed in another predetermined position,
    and if so, the optical pickup is arranged at a position where the next multiple record can be executed, in order to repeat the recording of data for a recording in the multiple recording,
    and if not, the process proceeds to a verification process as required.

* * * * *